US009690999B2

(12) United States Patent
Coleman et al.

(10) Patent No.: US 9,690,999 B2
(45) Date of Patent: *Jun. 27, 2017

(54) REMOTE RECOGNITION PROCESSING SYSTEM AND METHOD

(71) Applicant: Lockheed Martin Corporation, Bethesda, MD (US)

(72) Inventors: Chad Coleman, Binghamton, NY (US); Keith Quinn, Endicott, NY (US); Edward Ovando, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,124

(22) Filed: Feb. 3, 2016

(65) Prior Publication Data

US 2016/0155008 A1     Jun. 2, 2016

Related U.S. Application Data

(63) Continuation of application No. 14/720,736, filed on May 22, 2015, now Pat. No. 9,280,855, which is a (Continued)

(51) Int. Cl.
*G06K 9/00* (2006.01)
*G06F 17/00* (2006.01)
(Continued)

(52) U.S. Cl.
CPC ............ *G06K 9/00979* (2013.01); *B07C 3/12* (2013.01); *B07C 3/14* (2013.01); *G06F 17/15* (2013.01);
(Continued)

(58) Field of Classification Search
None
See application file for complete search history.

(56) References Cited

U.S. PATENT DOCUMENTS 4,632,252 A    12/1986  Haruki et al.
5,142,482 A     8/1992  Sansone
(Continued)

OTHER PUBLICATIONS

Notice of Allowance dated Apr. 29, 2016, in U.S. Appl. No. 14/788,768.

(Continued)

*Primary Examiner* — Randolph I Chu
(74) *Attorney, Agent, or Firm* — Miles & Stockbridge P.C.

(57) ABSTRACT

A computerized method for intelligently distributing computer processing of mail piece scan images across a plurality of mail piece scan image processors. The method can include receiving a mail piece scan image from a mail piece scan image job requestor and selecting one of a plurality of scan mail piece scan image processors to process said mail piece scan image. The mail piece scan image can be transmitted to said one of a plurality of plurality of mail piece scan image processors and a mail piece scan image processing result can be received from said one of a plurality of plurality of mail piece scan image processors. Post-processing operations can be performed based on said mail piece scan image processing result. The mail piece scan image processing result can be transmitted to said mail piece scan image processing requestor.

20 Claims, 6 Drawing Sheets

Related U.S. Application Data continuation of application No. 13/351,868, filed on Jan. 17, 2012, now Pat. No. 9,044,784.

(51) Int. Cl.

| | | |
|---|---|---|
| *B07C 3/12* | (2006.01) | |
| *G06F 17/15* | (2006.01) | |
| *G07B 17/00* | (2006.01) | |
| *B07C 3/14* | (2006.01) | |
| *G06K 9/20* | (2006.01) | |

(52) U.S. Cl.
CPC ..... *G06K 9/2063* (2013.01); *G07B 17/00661* (2013.01); *G06K 2209/01* (2013.01); *G07B 2017/00709* (2013.01)

(56) References Cited

U.S. PATENT DOCUMENTS

| | | | |
|---|---|---|---|
| 5,420,403 A | 5/1995 | Allum et al. | |
| 6,112,193 A * | 8/2000 | Dlugos | G07B 17/00733 283/71 |
| 6,427,021 B1 * | 7/2002 | Fischer | G07B 17/00024 382/100 |
| 6,665,422 B1 | 12/2003 | Seidel et al. | |
| 6,741,724 B1 * | 5/2004 | Bruce | G06F 17/273 382/101 |
| 6,934,691 B1 * | 8/2005 | Simpson | G06Q 20/102 382/101 |
| 7,138,596 B2 | 11/2006 | Pippin et al. | |
| 7,442,897 B2 | 10/2008 | Avant et al. | |
| 7,698,147 B2 | 4/2010 | Latta | |
| 7,751,604 B2 * | 7/2010 | Chang | G06F 19/321 382/128 |
| 7,765,024 B2 | 7/2010 | Brandt et al. | |
| 7,801,925 B2 | 9/2010 | Dearing et al. | |
| 7,826,922 B2 * | 11/2010 | Brandt | B07C 3/00 700/223 |
| 7,834,289 B2 * | 11/2010 | Orbke | B07C 3/14 209/3.3 |
| 7,847,206 B2 | 12/2010 | Brandt | |
| 7,883,013 B2 | 2/2011 | Skaaksrud et al. | |
| 7,885,844 B1 | 2/2011 | Cohen et al. | |
| 7,925,046 B2 | 4/2011 | Rundle et al. | |
| 8,085,980 B2 * | 12/2011 | Rundle | G06K 9/00979 382/101 |
| 8,131,607 B2 * | 3/2012 | Park | G06Q 10/047 705/28 |
| 8,625,841 B2 | 1/2014 | Ovando | |
| 8,625,842 B2 | 1/2014 | Ovando | |
| 9,280,855 B2 | 3/2016 | Coleman et al. | |
| 9,443,157 B2 | 9/2016 | Ovando | |
| 2002/0143880 A1 | 10/2002 | Sansone | G07B 17/00016 709/206 |
| 2003/0047494 A1 | 3/2003 | Lhomme | |
| 2003/0208368 A1 * | 11/2003 | Campbell | G06Q 10/08 705/337 |
| 2004/0030722 A1 * | 2/2004 | Garey | G06Q 10/08 |
| 2004/0049546 A1 | 3/2004 | Yoshida | |
| 2004/0139033 A1 * | 7/2004 | Amato | G06Q 30/06 705/400 |
| 2004/0263901 A1 * | 12/2004 | Critelli | G06Q 10/08 358/1.15 |
| 2004/0264739 A1 * | 12/2004 | Das | B07C 3/00 382/101 |
| 2005/0131576 A1 | 6/2005 | De Leo et al. | |
| 2006/0004697 A1 | 1/2006 | Lipsky et al. | |
| 2006/0004761 A1 * | 1/2006 | Maselli | G06Q 10/08 |
| 2006/0271234 A1 | 11/2006 | Gaug | |
| 2007/0098216 A1 | 5/2007 | Goyal et al. | |
| 2007/0098217 A1 * | 5/2007 | Goyal | B07C 3/00 382/101 |
| 2007/0204007 A1 * | 8/2007 | Ashaari | H04L 43/0817 709/217 |
| 2007/0239313 A1 | 10/2007 | Goyal et al. | |
| 2007/0265876 A1 * | 11/2007 | Campbell | G06Q 10/08 705/333 |
| 2008/0183329 A1 | 7/2008 | Gilham et al. | |
| 2008/0304704 A1 * | 12/2008 | Philip | G07B 17/00661 382/101 |
| 2009/0028383 A1 | 1/2009 | Bayer | |
| 2009/0139914 A1 | 6/2009 | Brandt | |
| 2009/0164390 A1 * | 6/2009 | Calman | G06Q 30/0283 705/400 |
| 2009/0319424 A1 * | 12/2009 | Calman | G06Q 20/04 705/42 |
| 2010/0040256 A1 * | 2/2010 | Rundle | G06K 9/00979 382/101 |
| 2010/0100436 A1 * | 4/2010 | Phifer | G06Q 10/107 705/14.49 |
| 2011/0035224 A1 | 2/2011 | Sipe | |
| 2011/0046775 A1 * | 2/2011 | Bailey | B07C 3/00 700/224 |
| 2012/0182588 A1 * | 7/2012 | Mampe | G07B 17/0008 358/3.28 |
| 2013/0036125 A1 * | 2/2013 | Pinjani | G06Q 50/26 707/754 |
| 2013/0182886 A1 | 7/2013 | Coleman et al. | |
| 2013/0182888 A1 | 7/2013 | Ovando | |
| 2013/0182889 A1 | 7/2013 | Ovando | |
| 2014/0086447 A1 | 3/2014 | Ovando | |

OTHER PUBLICATIONS

Notice of Allowance dated Aug. 30, 2013, in U.S. Appl. No. 13/351,749.
Notice of Allowance dated Sep. 3, 2013, in U.S. Appl. No. 13/351,810.
Nonfinal Office Action dated Jan. 13, 2014, in U.S. Appl. No. 13/351,868.
Nonfinal Office Action dated Jul. 15, 2014, in U.S. Appl. No. 13/351,868.
Nonfinal Office Action dated Sep. 24, 2014, in U.S. Appl. No. 14/092,940.
Notice of Allowance dated Feb. 2, 2015, in U.S. Appl. No. 13/351,868.
Notice of Allowance dated Feb. 24, 2015, in U.S. Appl. No. 14/092,940.
Nonfinal Office Action dated Sep. 14, 2015, in U.S. Appl. No. 14/720,736.
Notice of Allowance dated Oct. 28, 2015, in U.S. Appl. No. 14/720,736.
Nonfinal Office Action dated Jan. 20, 2016, in U.S. Appl. No. 14/788,768.

* cited by examiner

REMOTE RECOGNITION PROCESSING SYSTEM AND METHOD

Embodiments relate generally to automated mail piece recognition and, more particularly, to remote recognition processing systems and methods for intelligently distributing mail recognition processing using one or more central remote locations to distribute processing across a plurality of recognition processors.

Automated mail recognition processing may be performed by placing mail recognition computing hardware at each mail processing site located throughout a country. The recognition computing hardware at one mail processing site may sit idle for some portion of the day, while other recognition computing hardware at a different processing site may be overloaded, overtaxed, or out of service during the same portion of the day. A need may exist to provide mail recognition processing through the use of one or more central remote locations that can intelligently distribute mail recognition processing requests to available mail recognition processors. Deploying updated software and recognition computing hardware to each of the mail processing sites located throughout the country may entail significant deployment costs in terms of time and money. A need may also exist to provide mail recognition processing through the use of one or more central remote locations.

One embodiment can include a computer system for remote recognition processing of mail piece scan images captured by mail processing equipment housed in mail processing sites located across the country. The computer system can include a plurality of mail piece scan image processors adapted to perform mail recognition processing. The computer system can also include a mail piece scan image job manager coupled to each of the plurality of mail piece scan image processors. The mail piece scan image job manager can be coupled to a plurality of mail processing equipment. The mail piece scan image job manager can be adapted to receive a mail piece scan image from one of the plurality of mail processing equipment. The mail piece scan image can be associated with a mail piece. The mail piece scan image job manager can also be adapted to select, based on an at least one selection criterion, one of the plurality of mail piece scan image processors to process the mail piece scan image. The mail piece scan image job manager can also be adapted to transmit the mail piece scan image to the selected mail piece scan image processor and receive a mail piece scan image processing result from the selected mail piece scan image processor. The mail piece scan image job manager can also be adapted to store the mail piece scan image processing result, log the mail piece scan image, and update a tracking entry corresponding to the mail piece. The mail piece scan image job manager can also be adapted to transmit the mail piece scan image processing result to the mail processing equipment from which the mail piece scan image was received.

Another embodiment can include a computerized method for intelligently distributing computer processing of mail piece scan images across a plurality of mail piece scan image processors. The method can include receiving a mail piece scan image from a mail piece scan image job requestor. The method can also include selecting one of a plurality of mail piece scan image processors to process the mail piece scan image. The mail piece scan image can be transmitted to the selected mail piece scan image processor and a mail piece scan image processing result can be received from the selected mail piece scan image processor. The method can also include performing post-processing operations based on the mail piece scan image processing result. The mail piece scan image processing result can be transmitted to the mail piece scan image processing requestor.

Another embodiment can include a computer system for remote mail recognition processing. The computer system can include a processor and a memory coupled to the processor. The memory can store software instructions that, when executed by the processor, cause the processor to perform operations. The operations can include receiving a mail piece scan image processing request message from a mail piece scan image processing requestor. The mail piece scan image processing request message can include a mail piece scan image. The mail piece scan image can comprise a digital image of at least a portion of a mail piece. The operations can also include selecting one of a plurality of mail piece scan image processors and delegating mail recognition processing to the selected mail piece scan image processors. Delegating can include transmitting the mail piece scan image to the selected mail piece scan image processor and receiving a mail piece scan image processing result from the selected mail piece scan image processors. The mail piece scan image processing result can be stored and the mail piece scan image can be logged. The operations can also include updating a mail piece tracking information record associated with the mail piece. The mail piece scan image processing result can be transmitted to the mail piece scan image processing requestor. The mail piece scan image processing requestor can be an MPE (mail processing equipment) and the mail piece scan image processing result can provide routing information causing the mail processing equipment to facilitate sorting and routing of the mail piece.

DETAILED DESCRIPTION

Figure 1:
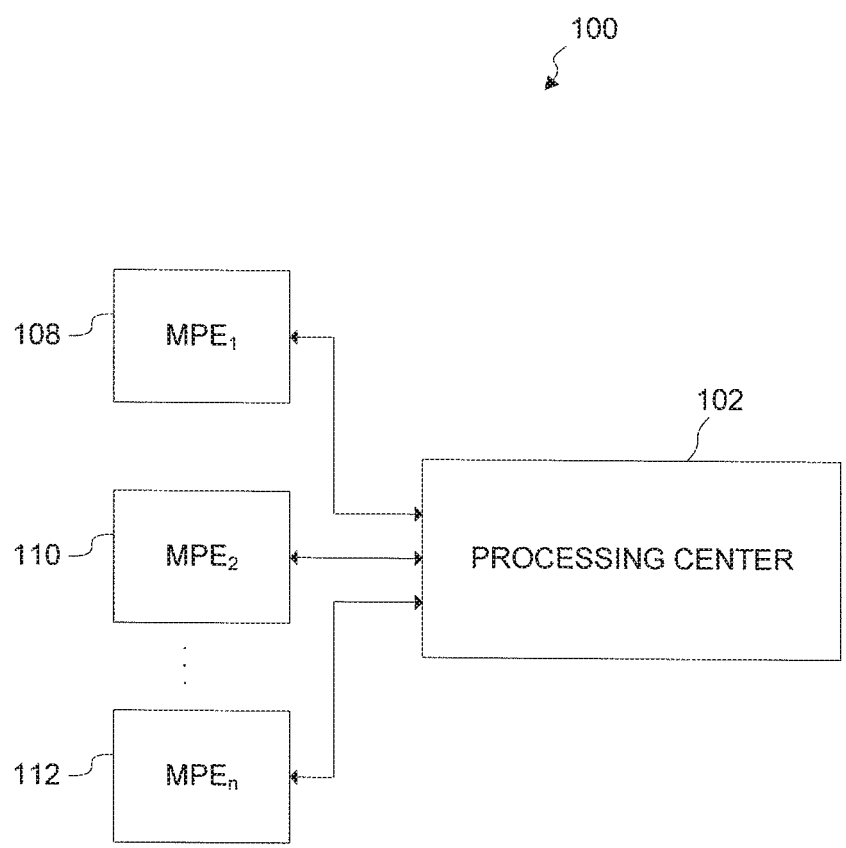
FIG. 1 is a block diagram of an exemplary embodiment of a remote recognition processing system.

FIG. 1 is a block diagram of an exemplary embodiment of a remote recognition processing system. System 100 can include a processing center 102. The processing center 102 can transmit data to and/or receive data from a plurality of MPE (mail processing equipment) 108, 110, and 112.

Figure 2:
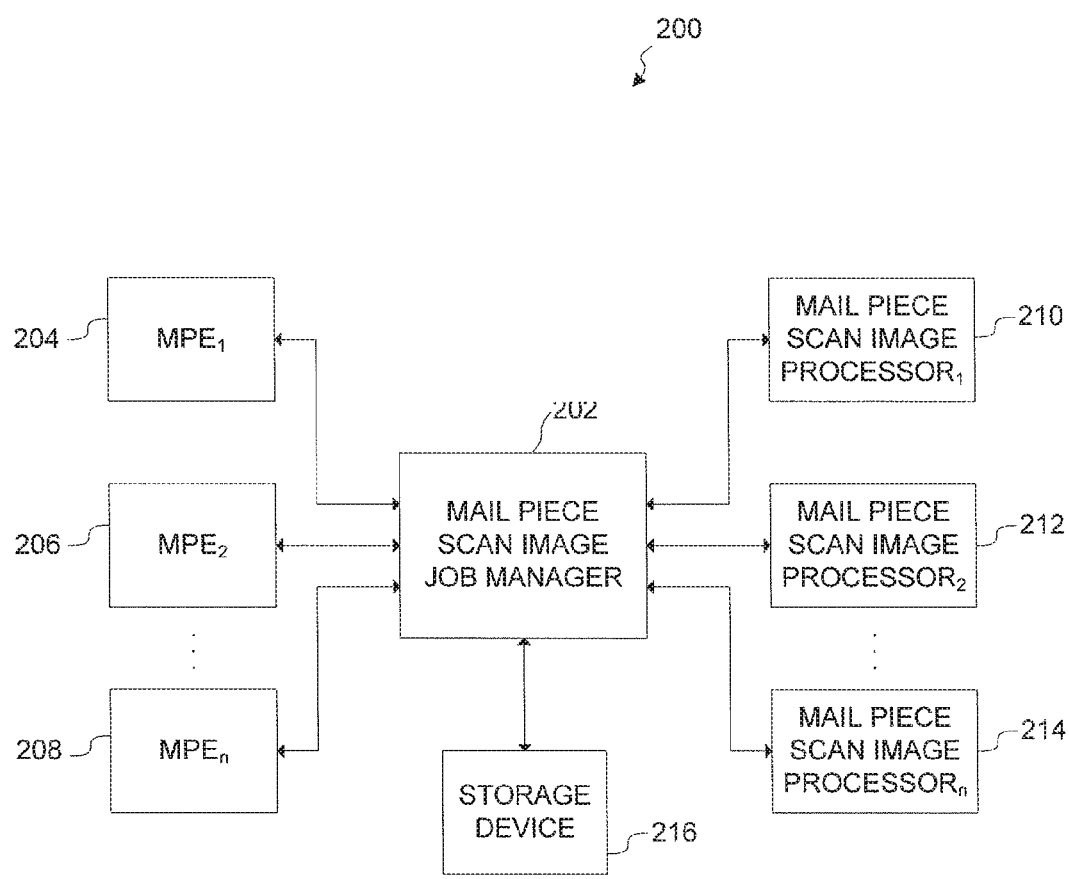
FIG. 2 is a block diagram of an exemplary embodiment of a remote recognition processing system having a mail piece scan image job manager.
Figure 3:
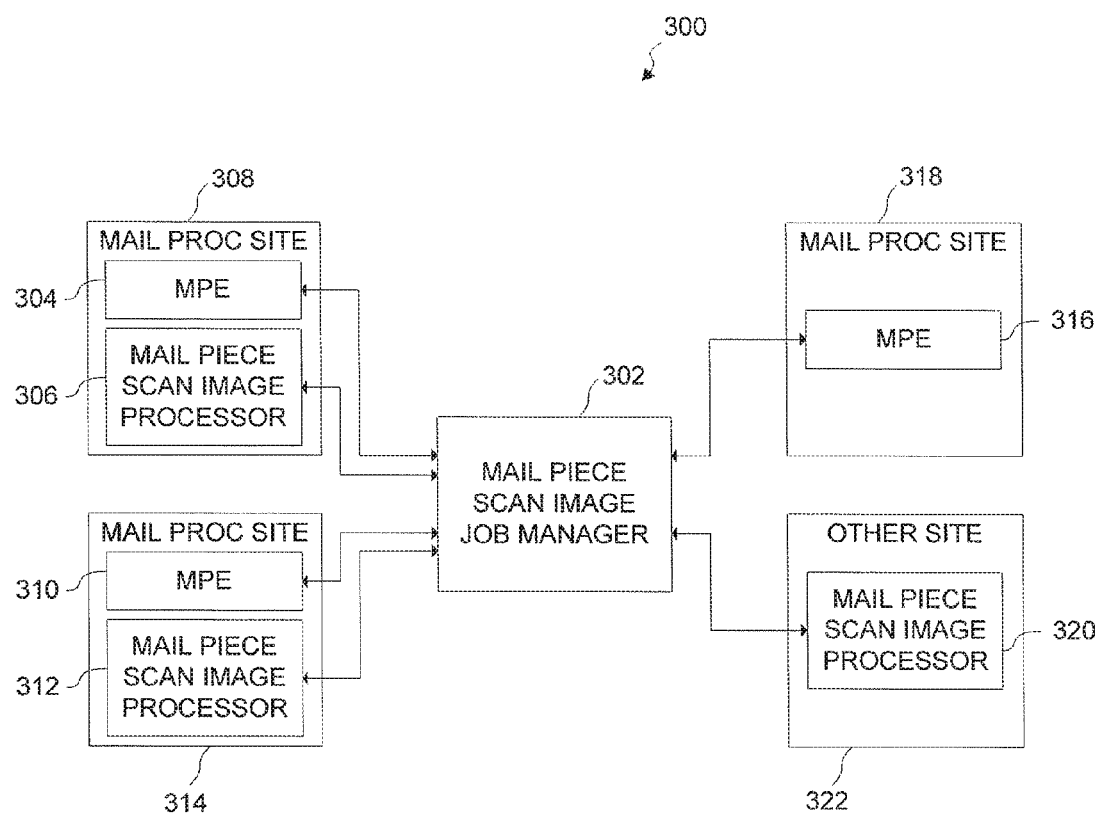
FIG. 3 is a block diagram of an exemplary embodiment of a remote recognition processing system distributed across mail processing sites.
Figure 4:
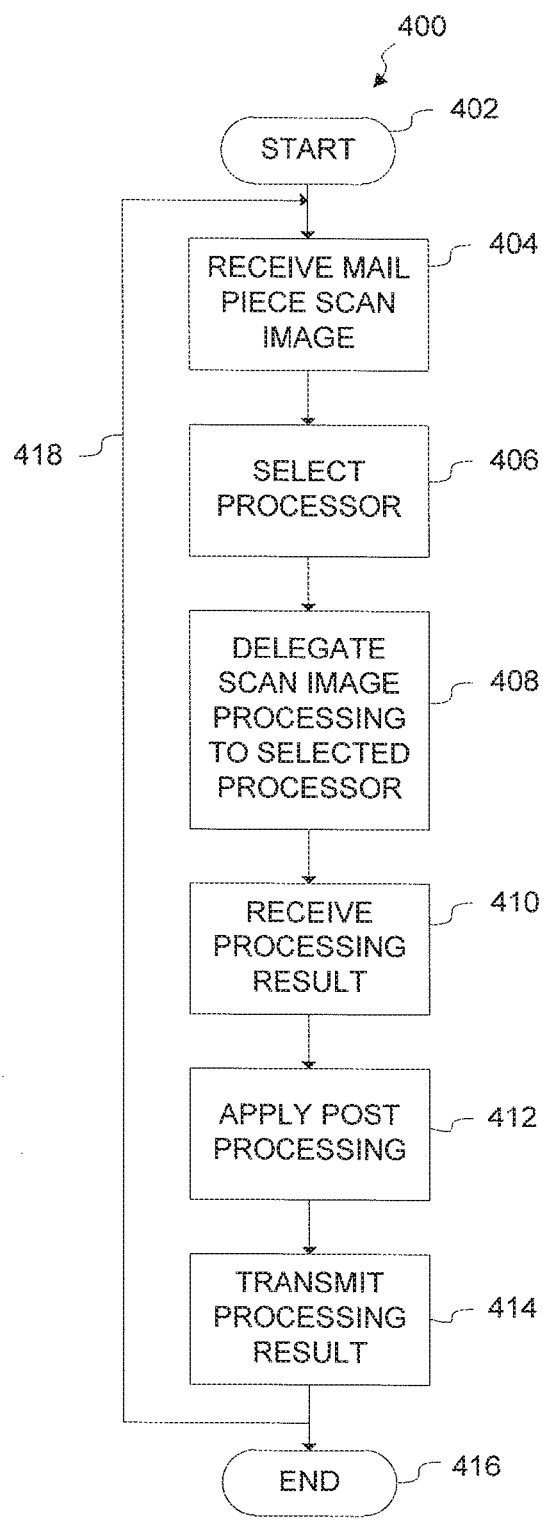
FIG. 4 is a flowchart showing an exemplary method for remote recognition processing.
Figure 5:
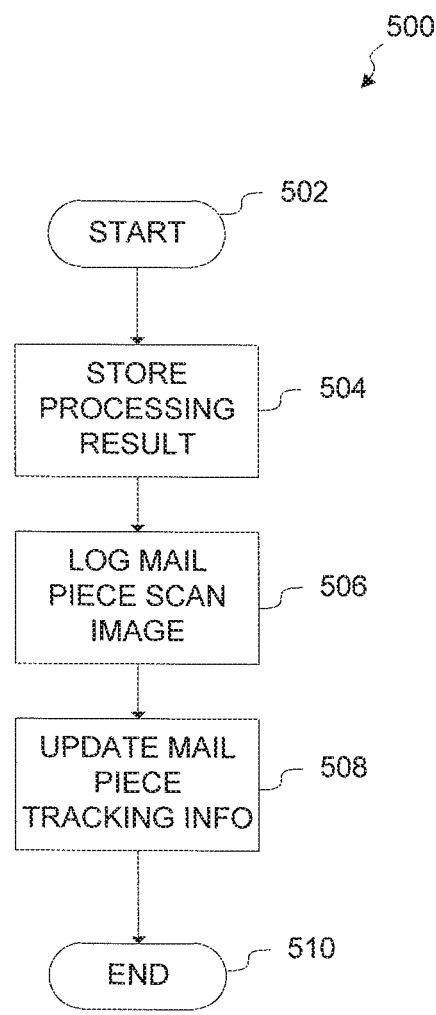
FIG. 5 is a flowchart showing an exemplary method for remote recognition post-processing.

In operation, the processing center 102 can receive mail piece scan images from a plurality of MPE (mail processing equipment) 108, 110, and 112 and transmit mail piece scan image processing results to the plurality of MPE (mail processing equipment) 108, 110, and 112 according to the processes shown in FIGS. 4 and 5. The processing center 102 can be software and/or hardware (e.g., a computer programmed for remote recognition processing) and can include one or more mail piece scan, image job managers and/or one or more mail piece scan image processors as shown in FIGS. 2 and 3. Each of the mail processing equipment 108, 110, and 112 can physically reside in one or more mail processing sites located across the country.

The processing center 102 can transmit data to and/or receive data from the plurality of MPE (mail processing equipment) 108, 110, and 112 via a network, such as but not limited to a local areal network (LAN), a wide area network (WAN), the Internet, an intranet, or any other wired or wireless network now known or later developed, or any combination thereof.

It will, be appreciated that, more than one processing center 102 may be employed to distribute the processing load or to provide redundancy in the case of any one processing center 102 becoming unable to adequately perform. For example, a mail service area, such as the United States, can be split into regions, each region having mail processing equipment configured to connect to a regional processing center (e.g., each region having a processing center 102).

FIG. 2 is a block diagram of an exemplary embodiment of a remote recognition processing system having a mail piece scan image job manager. System 200 can include a mail piece scan image job manager 202. The mail piece scan image job manager 202 can transmit data to and/or receive data from a plurality of MPE (or mail processing equipment) 204, 206, and 208. The mail piece scan image job manager 202 can transmit data to and/or receive data from a plurality of mail piece scan image processors 210, 212, and 214. The mail piece scan image job manager 202 can transmit data to and/or receive data from a storage device 216.

In operation, the mail piece scan image job manager 202 can receive mail piece scan images from a plurality of MPE (mail processing equipment) 204, 206, and 208, transmit mail piece scan images to a plurality of mail piece scan image processors 210, 212, and 214, receive mail piece scan image processing results from the plurality of mail piece scan image processors 210, 212, and 214, and/or transmit mail piece scan image processing results to the plurality of MPE (mail processing equipment) 204, 206, and 208 according to the processes shown in FIGS. 4 and 5. The mail piece scan image job manager 202 can also transmit data to and/or receive data from the storage device 216 to store the mail piece scan image processing results, log the mail piece scan images, and update tracking information according to the processes shown in FIGS. 4 and 5.

It will be appreciated that the mail piece scan image job manager 202 can be co-located with the plurality of mail piece scan image processors 210, 212, and 214 in a central location to create a mail recognition computing cloud. For example, the plurality of mail piece scan image processors 210, 212, and 214 can be computer hardware, programmed computer systems and/or software located in the same site as mail piece scan image job manager 202. In another example, the mail piece scan image job manager 202 and the plurality of mail piece scan image processors 210, 212, and 214 can be computer software executed on the same computer hardware programmed for performing scan image processing.

It will also be appreciated that the plurality of mail piece scan image processors 210, 212, and 214 can be substantially geographically distributed (e.g., across the country) to create a distributed mail recognition computing cloud. For example, the plurality of mail piece scan image processors 210, 212, and 214 can be computer hardware and/or software distributed across a mail service area, such as the United States. The mail scan image processors can be distributed such that there can be a mail piece scan image processor in each mail processing site or in a substantial number of processing sites, and the mail piece scan image processors can be connected to one or more central locations each having a mail piece scan job manager.

It will also be appreciated that more than one and/or separate storage devices may be used to store the mail piece scan image processing results, log the mail piece scan images, and update tracking information according to the processes shown, in FIGS. 4 and 5.

FIG. 3 is a block diagram of an exemplary embodiment of a remote recognition processing system distributed across mail processing sites. System 300 can include a mail piece scan image job manager 302, a mail processing site 308, a mail processing site 314, a mail processing site 318, and/or a site 322. The mail processing site 308 can include an MPE (mail processing equipment) 304 and a mail piece scan image processor 306. The mail processing site 314 can include an MPE (mail processing equipment) 310 and a mail piece scan image processor 312. The mail processing site 318 can contain an MPE (mail processing equipment) 316. The site 322 can contain a mail piece scan image processor 320.

In operation, the mail piece scan image job manager can receive mail piece scan images from mail processing equipment 304, mail processing equipment 310, and/or mail processing equipment 316, transmit mail piece scan images to the mail piece scan image processor 306, mail piece scan image processor 312, and/or mail piece scan image processor 320, receive mail piece scan image processing results from mail piece scan image processor 306, mail piece scan image processor 312, and/or mail piece scan image processor 320, and/or transmit mail piece scan image processing results to mail processing equipment 304, mail processing equipment 310, and/or mail processing equipment 316 according to the processes shown in FIGS. 4 and 5.

Mail processing sites 308, 314, and 318 can be locations where mail pieces are received, sorted, and/or routed by mail processing equipment 304, 310, and 316, respectively. Mail piece scan image processors 306 and 312 can be computer hardware, programmed computers and/or software located at mail processing sites 308 and 314, respectively. Some mail processing sites may not have any mail piece scan image processor, an example of which is given as mail processing site 318. Some sites may not have mail processing equipment but may have one or more mail piece scan image processors, and example of which is given as other site 322. The mail piece scan image job manager 302 can be located at a remote central location and can distribute processing across the mail piece scan image processors 306, 312, and 320 comprising the distributed cloud.

It will be appreciated that mail processing sites 308, 314, and 318 may have one or more pieces of mail processing equipment 304, 310, and 316, respectively, and mail processing sites 308 and 314 and site 322 can have one or more mail piece scan image processors 306, 312, and 320, respectively.

It will also be appreciated that mail processing site 308, mail processing site 314, mail processing site 318, and site 322 may be physically located in different geographic locations (e.g., different parts of the mail service area) and additional sites similar to 308, 314, 318, and 322 not pictured may be included. For example, there can be hundreds of mail processing sites across the United States, each having zero or more mail piece scan image processors connected to one or more mail piece scan image job managers to create a distributed cloud.

It will also be appreciated that recognition processing may be distributed across the mail piece scan image processors 306, 312, and 320. For example, a mail piece scan image received by the mail piece scan image job manager 302 from the mail processing equipment 304 may be processed by mail piece scan image processor 306, mail piece scan image processor 312, and/or mail piece scan image processor 320.

FIG. 4 is a flowchart showing an exemplary method for managing distributed remote recognition processing 400. Processing begins at 402 and continues to 404.

At 404, a mail piece scan image is received. The mail piece scan image can be received from a mail piece scan image job requestor (or mail processing equipment) at a mail piece scan image job manager as shown in FIGS. 2 and 3. The mail piece scan image can be a digital image or any other computer data representation of any portion of a mail piece obtained by a mail piece scanner. Processing continues to 406.

At 406, a mail piece scan image processor is selected. The mail piece scan image processor can be selected by the mail piece scan image job manager based on one or more availability factors calculated for each of the selectable mail piece scan image processors. For example, availability of a mail piece scan image processor can be based on the current load or current number of mail piece scan images being processed by a given mail piece scan image processor. In another example, mail piece scan image processors can be selected in a round-robin manner. A mail piece scan image processor can, for example, be adapted to process mail piece scan images captured by one or more types of mail processing equipment, and selection of a mail piece scan image processor can be based on the type of mail processing equipment that captured the mail piece scan image. Processing continues to 408.

At 408, recognition processing of the mail piece scan image is delegated to the selected mail piece scan image processor. The mail piece scan image received at 404 can be transmitted to the mail piece scan image processor selected at 406. Processing continues to 410.

At 410, a mail piece scan image processing result is received from the mail piece scan image processor selected at 406. Processing continues to 412.

At 412, post-processing operations are performed based on the mail piece scan image processing result received at 410. The post processing operations can include storing the mail piece scan image processing result, logging the mail piece scan image, and updating tracking information as described in FIG. 5. Processing continues to 414.

At 414, the mail piece scan image processing result received at 410 is transmitted to the mail piece scan image processing requestor (or mail processing equipment). Processing continues to 416, where processing ends.

It will be appreciated that operations 404-414 may be repeated in whole or in part (an example of which is indicated by line 416) to process multiple mail piece scan images.

FIG. 5 is a flowchart showing an exemplary method for remote recognition post-processing 500. Processing begins at 502 and continues to 504.

At 504, the mail piece scan image processing result is stored. For example, the mail piece scan image job manager can transmit the mail piece scan image processing result to a storage device, database and/or any other device by any method such that the mail piece scan image processing result is stored, archived and/or can be retrieved from the device at a later time. Processing continues to 506.

At 506, the mail piece scan image for which the mail piece scan image processing result was created is logged. Logging can include, for example, transmitting the mail piece scan image to a storage device, database and/or any other device by any method such that the mail piece scan image is logged, archived and/or can be retrieved from, the device at a later time. Processing continues to 506.

At 508, tracking information associated with the mail piece is updated. For example, the mail piece scan image job manager can transmit current tracking data based on the mail piece scan image processing result to a database or tracking system. Processing continues to 510, where processing ends.

It will be appreciated that mail piece scan image processing results and mail piece scan images can be stored and logged, respectively, to the same or different locations.

Figure 6:
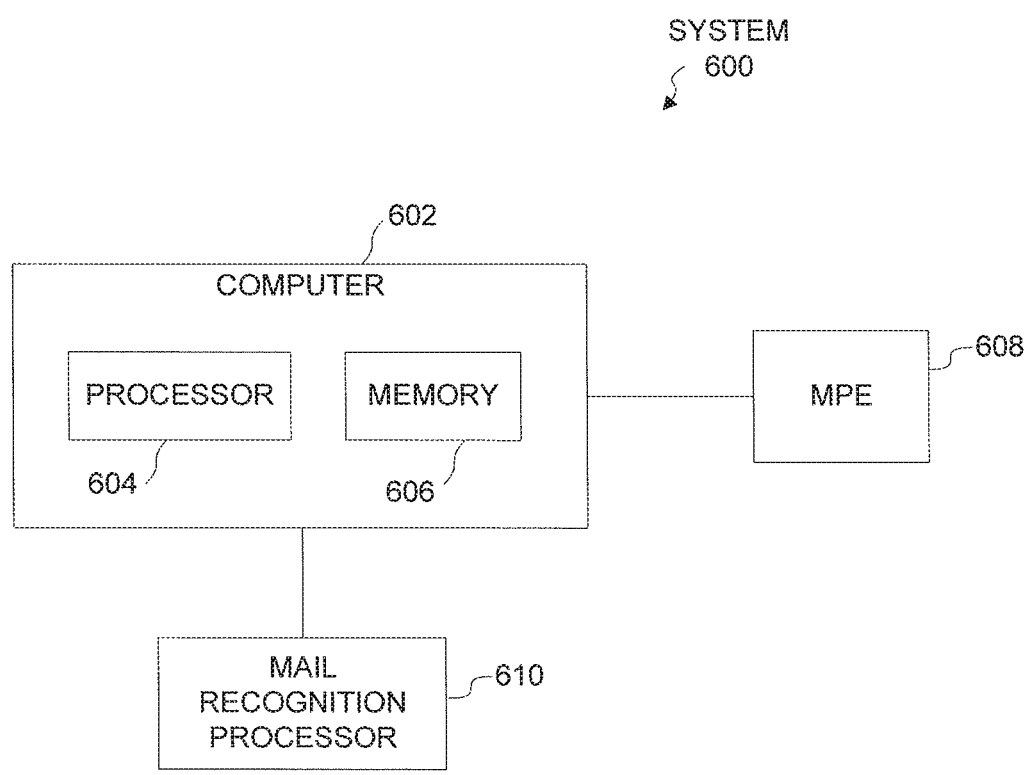
FIG. 6 is a block diagram of an exemplary embodiment of a remote recognition processing system.

FIG. 6 is a block diagram of an exemplary embodiment of a remote recognition processing system. System 600 can include a computer 602 that can include a processor 604 and a memory 606. The computer 602 can transmit mail piece scan image processing results to and/or receive mail piece scan images from one or more MPE (or mail processing equipment) 608. The computer 602 can transmit mail piece scan images to and/or receive mail piece scan image processing results from one or more mail recognition processors (or mail piece scan image processors) 608.

In operation, the processor 604 will execute instructions stored on the memory 606 that cause the computer 602 to transmit mail piece scan image processing results to and/or receive mail piece scan images from one or more mail processing equipment 608 and transmit mail piece scan images to and/or receive mail piece scan image processing results from one or more mail piece scan image processors 610 according to the processes shown in FIGS. 4 and 5.

It will be appreciated that the mail processing equipment 608 may be attached to the system using any connection type such as, but not limited to, a network, a local area network (LAN), a wide area network (WAN), an intranet, the Internet, or any other wired or wireless connection now known or later developed.

It will also be appreciated that the mail piece scan image processor 610 may be hardware and/or software attached to the system using any connection type such as, but not limited to, a network, a local area network (LAN), a wide area network (WAN), an intranet, the Internet, or any other wired or wireless connection now known or later developed.

It will also be appreciated that the mail piece scan image processor 610 may be a software component included as part of the instructions stored on the memory 606 executed by the processor 604.

It will be appreciated that the modules, processes, systems, and sections described above can be implemented in hardware, hardware programmed by software, software instructions stored on a nontransitory computer readable medium or a combination of the above. A remote recognition system, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or transponder device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or folly in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and network security arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and software for remote recognition systems.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A system for remote recognition processing of mail piece scan images captured by mail processing equipment housed in different geographically dispersed mail processing sites, the system comprising:
   a plurality of mail piece scan image processors adapted to perform mail recognition processing; and
   a mail piece scan image job manager geographically remote from one or more of the plurality of mail piece scan image processors and coupled to each of the plurality of mail piece scan image processors,
   the mail piece scan image job manager being adapted to
   (i) receive a mail piece scan image,
   (ii) select one of the plurality of mail piece scan image processors to process the mail piece scan image based on at least a type of mail processing equipment associated with the mail piece scan image, and
   (iii) delegating mail recognition processing to the selected one of the plurality of mail piece scan image processors.

2. The system of claim 1, wherein
   the mail piece scan image processors are located in a plurality of mail processing sites substantially geographically distributed,
   the mail processing equipment is located in a first mail processing site of the mail processing sites, and
   the selected mail piece scan image processor is located in a second mail processing site of the mail processing sites, the first and second mail processing sites being different.

3. The system of claim 1, wherein the mail piece scan image job manager is further adapted to:
   store a mail piece scan image processing result;
   log the mail piece scan image; and
   update a tracking entry corresponding to a mail piece, the mail piece scan image being an image of at least a portion of the mail piece.

4. The system of claim 1, wherein the plurality of mail piece scan image processors are substantially geographically distributed such that each of the plurality of mail piece scan image processors is located in a different one of the mail processing sites.

5. The system of claim 1, wherein the mail piece scan image job manager is coupled to the mail processing equipment in the mail processing sites via a network.

6. The system of claim 2, wherein each of the mail piece scan image processors is located in a different one of the plurality of mail processing sites.

7. The method of claim 2, wherein none of the mail piece scan image processors is located in the first mail processing site.

8. A computerized method for distributing computer processing of mail piece scan images across a plurality of mail piece scan image processors, the method comprising:

receiving, at a mail piece scan image job manager, a mail piece scan image from a mail piece scan image job requestor;

selecting, at the mail piece scan image job manager, one of a plurality of mail piece scan image processors to process the mail piece scan image based on at least a type of mail processing equipment associated with the mail piece scan image, the mail piece scan image job manager being geographically remote from one or more of the plurality of mail piece scan image processors and coupled to each of the plurality of mail piece scan image processors; and transmitting, from the mail piece scan image job manager, the mail piece scan image to the selected one of the plurality of mail piece scan image processors.

9. The method of claim 8, wherein the mail piece scan image job requestor is located remote from the plurality of mail piece scan image processors.

10. The method of claim 8, the method further comprising:

updating a tracking information record associated with a mail piece, the mail piece scan image being an image of at least a portion of the mail piece.

11. The method of claim 8, wherein each of the plurality of mail piece scan image processors is substantially geographically distributed such that each one of the plurality of mail piece scan image processors is located in a different one of the mail processing sites.

12. The method of claim 8, wherein the mail piece scan image is transmitted to the selected one of the plurality of mail piece scan image processors via a network, and a mail piece scan image processing result is received from the selected one of the plurality of mail piece scan image processors via the network.

13. The method of claim 8, wherein the mail piece scan image processors are located in a plurality of mail processing sites substantially geographically distributed, a mail piece scan image job requestor is located in a first mail processing site of the mail processing sites, and the selected mail piece scan image processor is located in a second mail processing site of the mail processing sites, the first and second mail processing sites being different.

14. The method of claim 13, wherein each of the mail piece scan image processors is located in a different one of the plurality of mail processing sites.

15. The method of claim 13, wherein none of the mail piece scan image processors is located in the first mail processing site.

16. A computer system configured to be a central processing system of mail piece scan images captured by mail processing equipment located across a large geographic area, the computer system comprising:

a processor; and a memory coupled to the processor, the memory having stored therein software instructions that, when executed by the processor, cause the processor to perform operations including receiving, at the processor, a mail piece scan image processing request, the mail piece scan image processing request including a mail piece scan image, selecting one of a plurality of mail piece scan image processors based on at least a type of mail processing equipment associated with the mail piece scan image, the processor being geographically remote from one or more of the plurality of mail piece scan image processors and coupled to each of the plurality of mail piece scan image processors, and transmitting, from the processor, the mail piece scan image to the selected one of the plurality of mail piece scan image processors.

17. The system of claim 16, wherein the mail piece scan image processing request is received from a mail piece scan image processing requestor via a network, and a mail piece scan image processing result is transmitted to the mail piece scan image processing requestor via the network.

18. The system of claim 16, wherein the mail piece scan image processors are located in a plurality of mail processing sites substantially geographically distributed, a mail piece scan image job requestor is located in a first mail processing site of the mail processing sites, and the selected mail piece scan image processor is located in a second mail processing site of the mail processing sites.

19. The system of claim 18, wherein each of the mail piece scan image processors is located in a different one of the plurality of mail processing sites substantially geographically distributed.

20. The method of claim 18, wherein none of the mail piece scan image processors is located in the first mail processing site.

* * * * *